US012657465B2

(12) United States Patent
Yu et al.

(10) Patent No.: US 12,657,465 B2
(45) Date of Patent: Jun. 16, 2026

(54) KNOWLEDGE BALANCING SELF-DISTILLATION WITH ADAPTIVE MUTUAL INFORMATION (AMI)

(71) Applicant: Microsoft Technology Licensing, LLC, Redmond, WA (US)

(72) Inventors: Ye Yu, Redmond, WA (US); Gaurav Mittal, Redmond, WA (US); Mei Chen, Bellevue, WA (US); Yu Gong, Burnaby (CA)

(73) Assignee: Microsoft Technology Licensing, LLC., Redmond, WA (US)

( * ) Notice: Subject to any disclaimer, the term of this patent is extended or adjusted under 35 U.S.C. 154(b) by 1102 days.

(21) Appl. No.: 17/503,150

(22) Filed: Oct. 15, 2021

(65) Prior Publication Data

US 2023/0118073 A1      Apr. 20, 2023

(51) Int. Cl.
*G06N 3/082* (2023.01)
*G06F 18/21* (2023.01)
*G06F 18/214* (2023.01)

(52) U.S. Cl.
CPC .......... *G06N 3/082* (2013.01); *G06F 18/214* (2023.01); *G06F 18/2178* (2023.01)

(58) Field of Classification Search
CPC .......... G06N 3/02–105; G06F 18/2178–2185; G06F 18/214–2155
See application file for complete search history.

(56) References Cited

U.S. PATENT DOCUMENTS

| | | | | | |
|---|---|---|---|---|---|
| 10,816,980 | B2 * | 10/2020 | Hazard | ................ | G05D 1/0088 |
| 11,610,154 | B1 * | 3/2023 | Teig | ........................ | G06N 3/047 |
| 2019/0258937 | A1 * | 8/2019 | Alemi | .................... | G06N 3/084 |
| 2021/0089922 | A1 * | 3/2021 | Lu | ............................ | G06N 3/04 |
| 2023/0128637 | A1 * | 4/2023 | Kouris | ...................... | G06T 7/12 |
| | | | | | 382/173 |

OTHER PUBLICATIONS

Dai, Bin, et al. "Compressing neural networks using the variational information bottleneck." International Conference on Machine Learning. PMLR, 2018. (Year: 2018).*

(Continued)

*Primary Examiner* — Liang Y Li
(74) *Attorney, Agent, or Firm* — Foley IP Law, PLLC

(57) ABSTRACT

Disclosed solutions for improved machine learning (ML) employ knowledge balancing self-distillation with adaptive mutual information (AMI). Examples include: for a neural network (NN) having a plurality of modules, determining a task objective for at least a final module of the plurality of modules; for the NN, determining a balancing objective using at least an output of the final module and an output of a first intermediate module of the plurality of modules; determining an overall objective, wherein determining the overall objective comprises combining the task objective with the balancing objective; and adjusting weights of the NN to minimize the overall objective. Balancing information may combine mutual information (between an intermediate module output and the output of the final module) with self-information (for the intermediate module output) to produce AMI. Adjusting weights of the NN during training, using the AMI, results in knowledge balancing self-distillation.

20 Claims, 9 Drawing Sheets

(56) References Cited

OTHER PUBLICATIONS

Oquab, Maxime, et al. "Learning and transferring mid-level image representations using convolutional neural networks." Proceedings of the IEEE conference on computer vision and pattern recognition. 2014. (Year: 2014).*

Yang, Yongxin, et al. "Simple and effective stochastic neural networks." Proceedings of the AAAI Conference on Artificial Intelligence. vol. 35. No. 4. May 18, 2021. (Year: 2021).*

Ahn, et al., "Variational information distillation for knowledge transfer", In Proceedings of the IEEE/CVF Conference on Computer Vision and Pattern Recognition, Jun. 16, 2019, pp. 9163-9171.

Alemi, et al., "Deep variational information bottleneck", In Proceedings of the International Conference on Learning Representations, Apr. 24, 2017, pp. 1-19.

Belghazi, et al., "Mutual information neural estimation", In Proceedings of the 35 th International Conference on Machine Learning, Jul. 3, 2018, 10 Pages.

Chung, et al., "Feature-map-level online adversarial knowledge distillation", In Proceedings of International Conference on Machine Learning, Nov. 21, 2020, 10 Pages.

Donsker, et al., "Asymptotic evaluation of certain markov process expectations for large time", In Journal of communication on pure and applied mathematics, Mar. 1983.

Goodfellow, et al., "Generative adversarial nets", In Journal of Advances in neural information processing systems, Dec. 8, 2014, pp. 1-9.

Gou, et al., "Knowledge distillation: A survey", In Repository of arXiv:2006.05525v4, Oct. 23, 2020, pp. 1-34.

Gregor, et al., "Draw: A recurrent neural network for image generation", In Proceedings of International Conference on Machine Learning, Jun. 1, 2015, 10 Pages.

He, et al., "Deep Residual Learning for Image Recognition", In Proceedings of the IEEE Conference on Computer Vision and Pattern Recognition, Jun. 27, 2016, pp. 770-778.

Hinton, et al., "Distilling the Knowledge in a Neural Network", In Repository of arXiv:1503.02531v1, Mar. 9, 2015, 9 Pages.

Hjelm, et al., "Learning deep representations by mutual information estimation and maximization", In Proceedings of International Conference on Learning Representations, May 6, 2019, pp. 1-24.

Hu, et al., "Squeeze-and-Excitation Networks", In Proceedings of IEEE Conference on Computer Vision and Pattern Recognition, Jun. 18, 2018, pp. 7132-7141.

Huang, et al., "Densely connected convolutional networks", In Proceedings of the IEEE conference on computer vision and pattern recognition, Jul. 21, 2017, pp. 4700-4708.

Huang, et al., "Like what you like: Knowledge distill via neuron selectivity transfer", In Repository of arXiv:1707.01219v2, Dec. 18, 2017, pp. 1-9.

Krizhevsky, Alex, "Learning Multiple Layers of Features From Tiny Images", In Technical report, Apr. 8, 2009, 60 Pages.

Lee, et al., "Self-supervised label augmentation via input transformations", In Proceedings of international Conference on Machine Learning, Nov. 21, 2020, 11 Pages.

Linsker, et al., "Self-organization in a perceptual network", In Journal of Computer, vol. 21, Issue: 3, Mar. 1988, pp. 105-117.

Mirzadeh, et al., "Improved knowledge distillation via teacher assistant", In Proceedings of the AAAI Conference on Artificial Intelligence, Apr. 3, 2020, pp. 5191-5198.

Oord, et al., "Representation learning with contrastive predictive coding", In Repository of arXiv:1807.03748v1, Jul. 10, 2018, pp. 1-13.

Redmon, et al., "YOLO9000: Better, faster, stronger", In Repository of arXiv preprint arXiv:1612.08242, Dec. 25, 2016, 9 Pages.

Rezende, et al., "Stochastic backpropagation and approximate inference in deep generative models", In Proceedings of the 31st International Conference on Machine Learning, Jun. 21, 2014, 14 Pages.

Romero, et al., "Fitnets: Hints for thin deep nets", In Proceedings of the International Conference on Learning Representations, May 7, 2015, pp. 1-13.

Sandler, et al., "Mobilenetv2: Inverted residuals and linear bottlenecks", In Proceedings of the IEEE Conference on Computer Vision and Pattern Recognition, Jun. 18, 2018, pp. 4510-4520.

Saxe, et al., "On the information bottleneck theory of deep learning", In Proceedings of the International Conference on Learning Representations, Apr. 30, 2018, pp. 1-27.

Simonyan, et al., "Very Deep Convolutional Networks for Large-Scale Image Recognition", In Proceedings of 3rd International Conference on Learning Representations, May 7, 2015, 14 Pages.

Springenberg, et al., "Striving for simplicity: The all convolutional net", In Proceedings of 3rd International Conference on Learning Representations, May 7, 2015, pp. 1-14.

Tan, et al., "Efficientnet: Rethinking Model Scaling for Convolutional Neural Networks", In Proceedings of the 36th International Conference on Machine Learning, May 28, 2019, 10 Pages.

Tian, et al., "Contrastive Multiview Coding", In Proceedings of 16th European Conference on Computer Vision, Dec. 18, 2020, pp. 1-16.

Tian, et al., "Contrastive representation distillation", In Proceedings of the International Conference on Learning Representations, Apr. 26, 2020, pp. 1-19.

Yang, et al., "Snapshot distillation: Teacher-student optimization in one generation", In Proceedings of the IEEE Conference on Computer Vision and Pattern Recognition, Jun. 16, 2019, pp. 2859-2868.

Yuan, et al., "Revisiting knowledge distillation via label smoothing regularization", In Proceedings of the IEEE Conference on Computer Vision and Pattern Recognition, Jun. 13, 2020, pp. 3903-3911.

Yun, et al., "Regularizing class-wise predictions via self-knowledge distillation", In Proceedings of the IEEE/CVF conference on computer vision and pattern recognition, Jun. 16, 2020, pp. 13876-13885.

Zagoruyko, et al., "Paying more attention to attention: improving the performance of convolutional neural networks via attention transfer", In Proceedings of 5th International Conference on Learning Representations, Apr. 24, 2017, pp. 1-13.

Zeiler, et al., "Visualizing and understanding convolutional networks", In Proceedings of European Conference on Computer Vision, Sep. 6, 2014, pp. 818-833.

Zhang, et al., "Be your own teacher: Improve the performance of convolutional neural networks via self distillation", In Proceedings of the IEEE/CVF International Conference on Computer Vision, Oct. 27, 2019, pp. 3713-3722.

Zoph, et al., "Neural Architecture Search with Reinforcement Learning", In Proceedings of the 5th International Conference on Learning Representations, Apr. 2017, 16 Pages.

Chen, et al., "On Self-Distilling Graph Neural Network", In Repository of arXiv:2011.02255v2, Apr. 30, 2021, 12 Pages.

"International Search Report and Written Opinion Issued in PCT Application No. PCT/US22/038411", Mailed Date: Nov. 15, 2022, 15 Pages.

Wang, et al., "Knowledge Distillation And Student-Teacher Learning For Visual Intelligence: A Review And New Outlooks", In Repository of arXiv:2004.05937v7, Jun. 17, 2021, 40 Pages.

* cited by examiner

Figure 7:
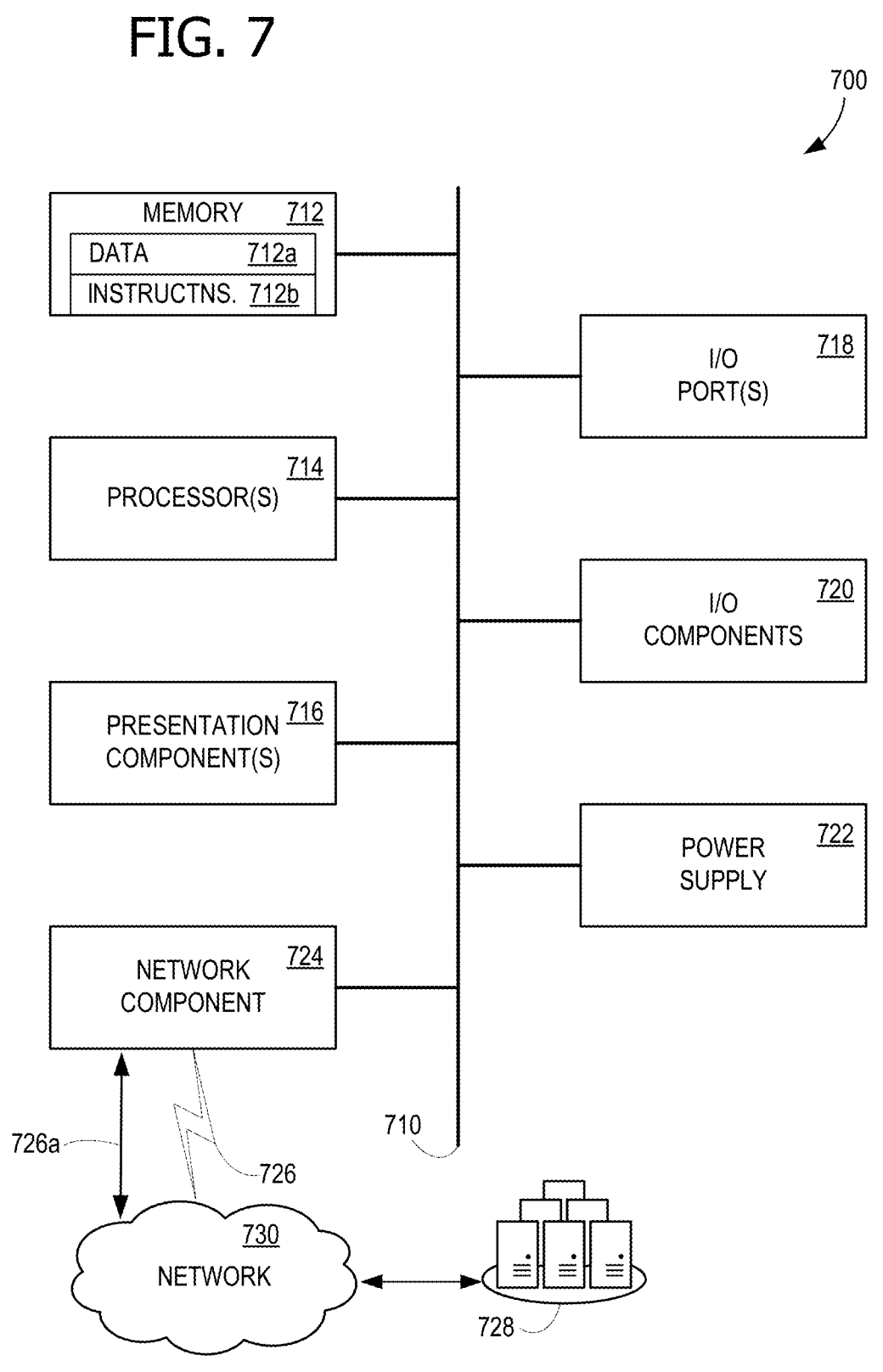

| MEMORY      712 |
| DATA         712a |
| INSTRUCTNS. 712b |

| PROCESSOR(S)   714 |

| PRESENTATION  716 COMPONENT(S) |

| NETWORK        724 COMPONENT |

| I/O          718 PORT(S) |

| I/O          720 COMPONENTS |

| POWER        722 SUPPLY |

726a

726

710

730
NETWORK

728

KNOWLEDGE BALANCING SELF-DISTILLATION WITH ADAPTIVE MUTUAL INFORMATION (AMI)

BACKGROUND

Convolutional neural networks (CNNs) are often employed for computer vision (CV) tasks, using various architectures and building blocks in an attempt to improve performance. However CNNs used for CV tasks tend to be large in size. Training large machine learning (ML) models (which includes NNs) is time-consuming, and the large ML models are often unsuitable for edge devices.

Knowledge distillation (KD), originally proposed to compress the knowledge from an ensemble into a single ML model, has been studied in the context of CNNs [10]. KD learns a compact student model by transferring the "dark knowledge" from a larger teacher model. However, there are drawbacks of conventional KD: (1) a cumbersome teacher model brings a larger amount of parameters and training overhead; (2) selection of the optimal teacher model is non-trivial, since a larger and more accurate teacher model may not always lead to a better student model; (3) conventional KD only optimizes the student model, and improving the teacher model requires additional optimization.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Disclosed solutions for improved machine learning (ML) employ knowledge balancing self-distillation with adaptive mutual information (AMI). Examples include: for a neural network (NN) having a plurality of modules, determining a task objective for at least a final module of the plurality of modules; for the NN, determining a balancing objective using at least an output of the final module and an output of a first intermediate module of the plurality of modules; determining an overall objective, wherein determining the overall objective comprises combining the task objective with the balancing objective; and adjusting weights of the NN to minimize the overall objective. Balancing information may combine mutual information (between an intermediate module output and the output of the final module) with self-information (for the intermediate module output) to produce AMI. Adjusting weights of the NN during training, using the AMI, results in knowledge balancing self-distillation.

BRIEF DESCRIPTION OF THE DRAWINGS

The disclosed examples are described in detail below with reference to the accompanying drawing figures listed below:

FIG. 7 is a block diagram of an example computing environment suitable for implementing some of the various examples disclosed herein.

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Disclosed solutions for improved machine learning (ML) employ knowledge balancing self-distillation with adaptive mutual information (AMI). Examples include: for a neural network (NN) having a plurality of modules, determining a task objective for at least a final module of the plurality of modules; for the NN, determining a balancing objective using at least an output of the final module and an output of a first intermediate module of the plurality of modules; determining an overall objective, wherein determining the overall objective comprises combining the task objective with the balancing objective; and adjusting weights of the NN to minimize the overall objective. Balancing information may combine mutual information (between an intermediate module output and the output of the final module) with self-information (for the intermediate module output) to produce AMI. Adjusting weights of the NN during training, using the AMI, results in knowledge balancing self-distillation.

Aspects of the disclosure improve the operations of computing devices at least by improving the accuracy of ML models. Using knowledge balancing self-distillation a family of models targeting different accuracy/speed trade-offs (e.g., using differing size models) may be generated with a single model training process, thereby efficiently supporting multiple use scenarios—from higher accuracy (larger size) to higher speed (smaller size). Thus, aspects of the disclosure also improve the efficiency of training ML models, for example by determining an overall objective by combining a task objective with a balancing objective and adjust weights of an NN (in an ML model) to minimize the overall objective.

In ML, knowledge distillation is the process of transferring knowledge from a large model to a smaller one. Self-distillation provides a single NN that is executable at different depths, permitting adaptive accuracy-efficiency trade-offs on resource-limited edge devices. ML model compression produces an ML model that is simplified from the original ML model, hopefully without significantly diminished accuracy. A simplified ML model is one that is reduced in size and/or latency from the original ML model.

Figure 1:
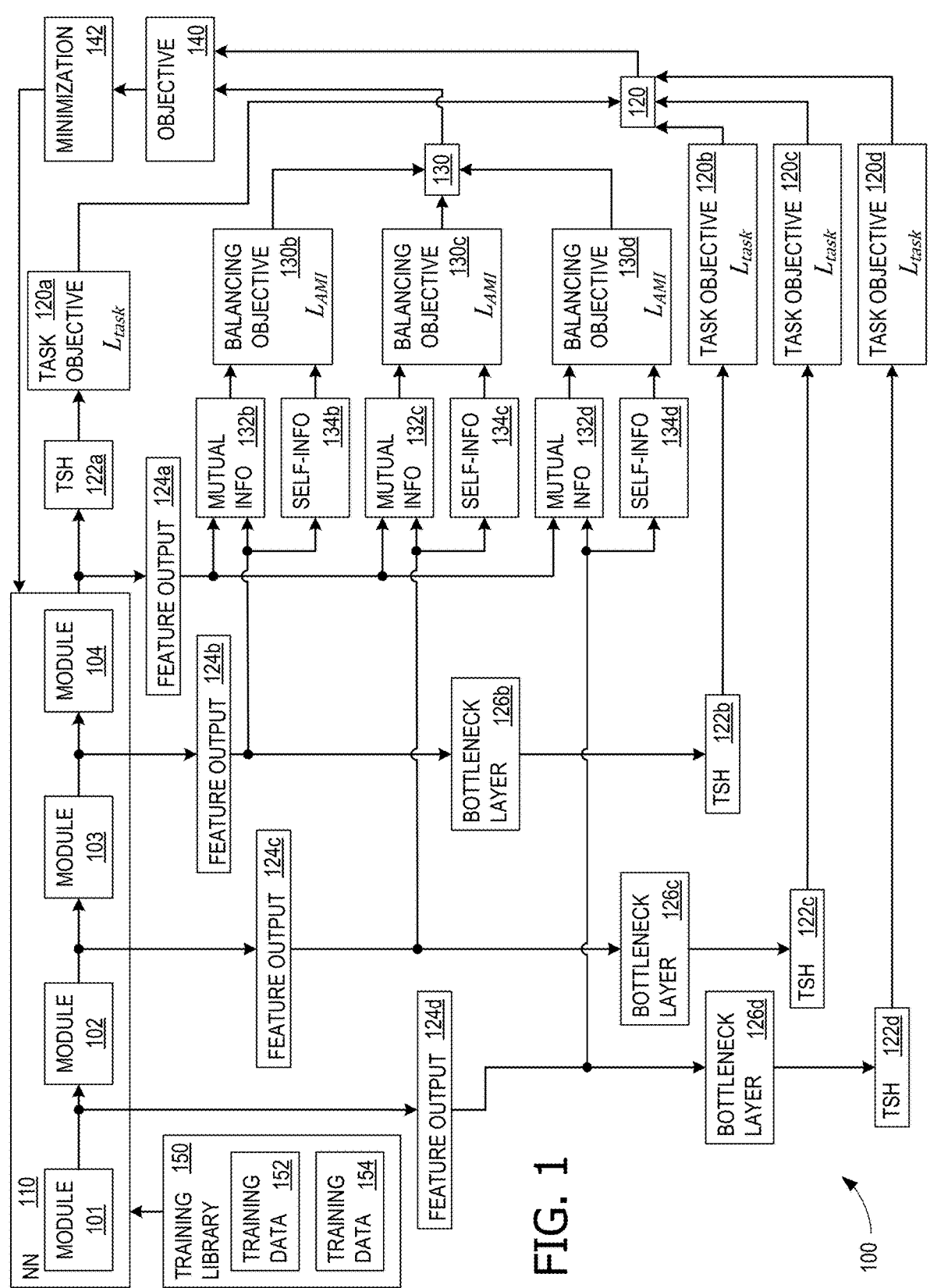
FIG. 1 illustrates an example arrangement that advantageously employs knowledge balancing self-distillation with adaptive mutual information (AMI) to improve machine learning (ML) performance and efficiency.

FIG. 1 illustrates an example arrangement 100 that advantageously employs knowledge balancing self-distillation with AMI to improve ML performance and efficiency. In arrangement 100, knowledge is distilled by mutual information (e.g., mutual information 132b-132d) and balanced by being weighted using self-information (e.g., self-information 134b-134d). Self-information interacts with mutual information to improve distillation. The knowledge from intermediate features (e.g., feature outputs 124b-124d) is flexibly balanced, rather than directionally transferred from one layer to another. Training is self-contained and alleviates the requirement of training a powerful teacher model.

Figure 1A:
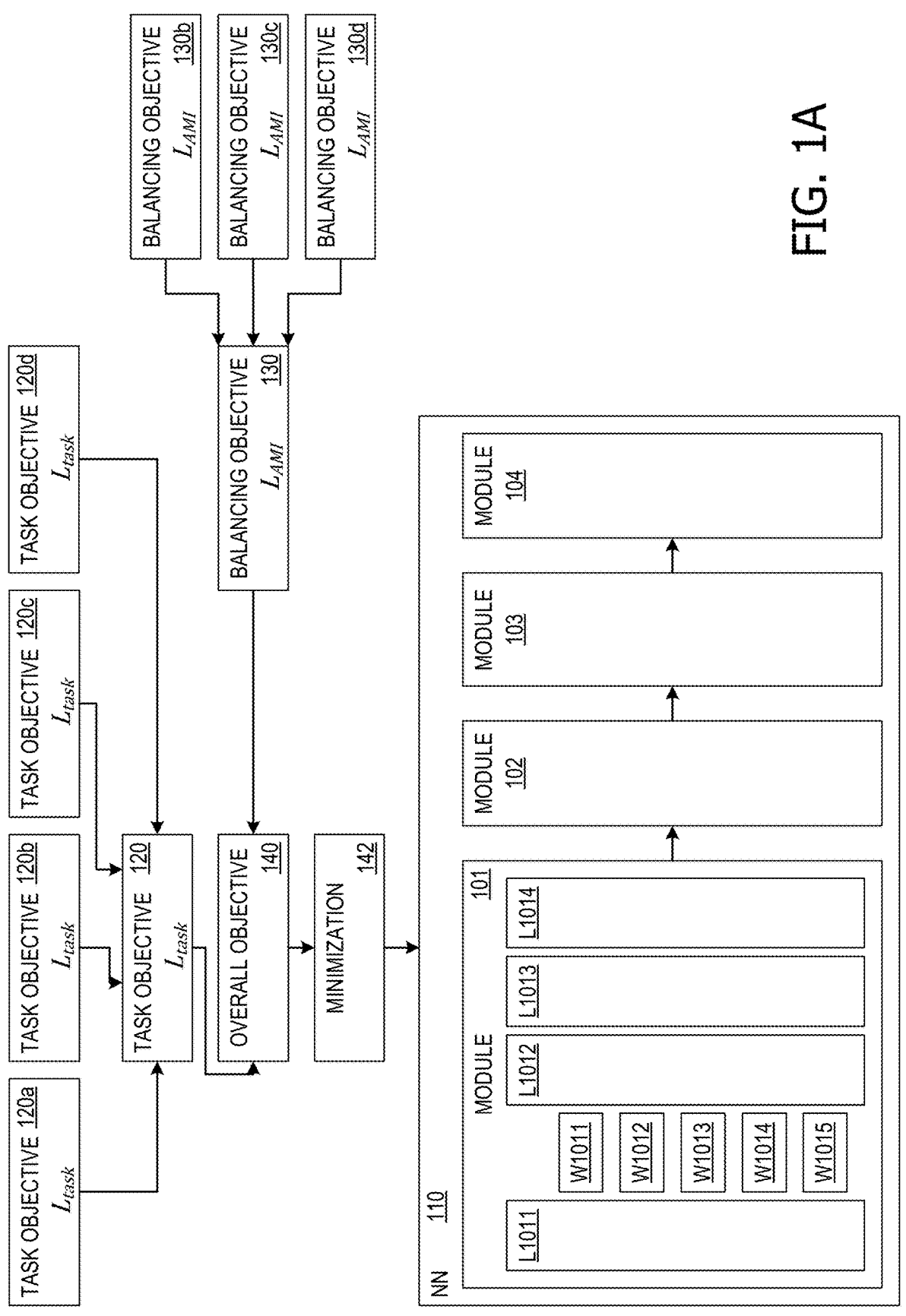
FIG. 1A illustrates further details for the arrangement of FIG. 1.

Arrangement 100 provides for training NN 110, which comprises a plurality of modules: a module 101, a module 102, a module 103, and a module 104. Each module contains multiple layers, as shown in FIG. 1A. Some examples use a different number of modules. Each module does not necessarily have the same structure and may have various components depending on the architecture of the feature extraction. In some examples, NN 110 comprises a convolutional NN (CNN), and performs a computer vision (CV) task, such as image classification, object detection, and decoding.

NN 110 is trained using a training library 150 that contains generic training data 152 (e.g., a labeled image), customer-specific training data 154, and other training data. Using training library 150 such that each training data set has had an opportunity to update the internal parameters (e.g., internal weights) of NN 110 is an epoch. Training may involve multiple epochs. When training data 152 is passed through NN 110, features are output from the various modules, such as feature output 124a from module 104, feature output 124b from module 103, feature output 124c from module 102, and feature output 124d from module 101. Training with generic training data 152 may be referred to as initial training, and training with customer-specific training data 154 (following initial training) may be referred to as fine-tuning. Both initial training and fine-tuning occur with self-distillation.

The output of module 104 is sent to a task-specific head (TSH) 122a, which gives a task objective 120a. Feature output 124b is sent through a bottleneck layer 126b to a TSH 122b, which gives a task objective 120b. Feature output 124c is sent through a bottleneck layer 126c to a TSH 122c, which gives a task objective 120c. Feature output 124d is sent through a bottleneck layer 126d to a TSH 122d, which gives a task objective 120d. Bottleneck layers 126b-126d are used to reduce dimensionality of feature outputs 124b-124d, respectively, so they may be fed into the corresponding one of TSHs 122b-122d. Task objectives 120a-120c are combined into a task objective 120, bask, which is a loss function that becomes a portion of an overall objective 140, as described below. In some examples, TSHs 122a-122d may be classifiers, detectors, or decoders.

Feature output 124a and feature output 124b are also used for determining mutual information 132b, as described below. Self-information 134b is extracted from feature output 124b, as described below. Mutual information 132b and self-information 134b are combined to produce a balancing objective 130b, which gives AMI. Feature output 124b and feature output 124c are also used for determining mutual information 132c. Self-information 134c is extracted from feature output 124c. Mutual information 132c and self-information 134c are combined to produce a balancing objective 130b, which gives AMI. Feature output 124c and feature output 124d are also used for determining mutual information 132d. Self-information 134d is extracted from feature output 124d. Mutual information 132d and self-information 134d are combined to produce a balancing objective 130d, which gives AMI. Balancing objectives

130b-130c are combined into a balancing objective 130, $L_{AMI}$, which is a loss function that also becomes a portion of overall objective 140.

Self-information is estimated using the three intermediate feature outputs (e.g., feature outputs 124b-124d), and the scalar value of the self-information is multiplied by the value of the mutual information to determine the amount of the mutual information that is lost. The lower the value of the product, the less information is lost. A minimization function 142 intakes overall objective 140 and trains NN 110 by adjusting weights within NN 110 (as shown in FIG. 1A), to minimize overall objective 140 (e.g., minimize the composite loss function). In some examples, backpropagation is used.

FIG. 1A illustrates further details for arrangement 100. The experience that NN 110 learns from data in training library 150 is contained in hidden layer weights, such as weights W1011-W1015. The weights store the past experience learned from the data, and the activations of the hidden layers (or features) represent the direct response from NN 110 to the data (e.g., training data 152). Module 101 is illustrated as having four layers, layer L1011, layer L1012, layer L1013, and layer L1014, although some examples use a different number of layers. Module 101 is also illustrated as having weights between layers (e.g., weights between nodes of different layers).

For example, a weight W101, a weight W102, a weight W103, a weight W104, and a weight W105 are shown between layer L1011 and L1012, although some example may have a considerably larger number of weights (e.g., numbering in the thousands, millions, or more). Weights also exist between other layers, such as between layers L1012 and L1013, and between layers L1013 and L1014. These additional weights are omitted from illustration FIG. 1A in order to preserve clarity. Modules 102-104 may be similarly configured as module 101.

Self-distillation of knowledge about the task of NN 110 is achieved with the intermediate features using the AMI, which is leveraged to maximize the mutual information between different features and flexibly balance the knowledge. That is, the knowledge in features within NN 110 are balanced, rather than directionally transferred from one presumably more expressive feature to another. NN 110 is decomposed into multiple modules 101-104 in which intermediate features (e.g., feature outputs 124b-124d) are extracted to perform the same downstream tasks. Each module performs the same task and the knowledge from the features is interacted via AMI. Training is guided by two objectives, task objective 120 ($L_{task}$), providing direct supervision from task labels, and balancing objective 130 ($L_{AMI}$), enforcing the knowledge from different features to be balanced. This yields the overall objective:

$$L = L_{AMI} + L_{task} \qquad \text{Eq. (1)}$$

A CNN associated with a directed acyclic graph may be parameterized by $\{\theta_1, \theta_2, \ldots \theta_T\}$, where T is the length of depth-wise decomposition and each $\theta_i$ contains multiple consecutive hidden layers. Defining $X \sim p_{data}(X)$ to be a random sample drawn from an empirical data distribution, the feature at module k is obtained by a nonlinear transformation:

$$F_k = E_{\theta < k+1}(X) \qquad \text{Eq. (2)}$$

Maximizing the mutual information between corresponding features distills knowledge from one module to another:

$$I(F_m; F_n) = H(F_m) - H(F_m | F_n) \qquad \text{Eq. (3)}$$

5

The mutual information between features $F_m$ and $F_n$ may be simultaneously estimated and maximized:

$$\tilde{I}_{\theta,\Phi}(F_m; F_n) =$$

$$E_{p(F_m,F_n)}\left[T_{\Phi_{m,n}}(f_m, f_n)\right] - H(F_m \mid F_n) - \log E_{p(F_m)p(F_n)}\left[e^{T_{\Phi_{m,n}}(f_m,f_n)}\right] \quad \text{Eq. (4)}$$

where $T_{\Phi_{m,n}}: \mathcal{F}_m \times \mathcal{F}_n$ is the discriminator function modeled by a neural network parameterized by $\Phi_{m,n}$, and $\mathcal{F}_m$, $\mathcal{F}_n$ are the domains of $F_m$, $F_n$.

Eq. (4) allows estimation and maximization of the mutual information between features. A similar strategy may be applied to estimate self-information:

$$I(F_m;F_m)=H(F_m)-H(F_m|F_m)=H(F_m) \quad \text{Eq. (5)}$$

The Shannon entropy $H(F_m)$ is another notion of the self-information of $F_m$ about itself, while the mutual information is a measure of the information obtained from another random variable. This enables quantifying how informative a particular feature may be. AMI thus comprises estimation and maximization on mutual information between features and self-information in each feature. The knowledge from different features is distilled by mutual information and balanced by self-information weighting.

Given the decomposition of T modules, the features $\{F_1, F_2, \ldots F_T\}$ yields $T(T-1)/2$ mutual information between each pair. The knowledge between each pair of features may be distilled by maximizing the total mutual information (MI) of all pairs of features:

$$MI(F_1 \ldots F_T)=\Sigma_{i=1 \ldots T, j=1 \ldots T, i<j}I(F_i;F_j) \quad \text{Eq. (6)}$$

Maximizing MI may be accomplished by maximizing self-information and a conditional entropy. Since both $F_i$ and $F_T$ are dynamically learnable, they should be maximized jointly. However, for different datasets and tasks, introducing a strong dependency between some pairs of features does not always improve the performance, and sometimes even worsens it. Thus, Eq. (6) may not be ideal for training.

Self-information (or entropy) is a measure of information in the range [0,1], which may be used for a weighting scheme. To construct the interaction between feature knowledge, a single module k is selected as a base module, and the mutual information is maximized between $F_k$ and features $(F_n)$ of the other modules. A feature discrepancy is introduced by multiplying each mutual information with an entropy, thereby producing AMI. The AMI between the base $F_k$ and an arbitrary feature $F_n$ is defined as:

$$AMI(F_k,F_n)=H(F_n)I(F_k;F_n) \quad \text{Eq. (7)}$$

For all pairs of features of interest, the total considered AMI is the summation of T−1 components:

$$\Sigma_{i=1 \ldots T, i\neq k}AMI(F_k;F_i) \quad \text{Eq. (8)}$$

The self-information (entropy) is multiplied by each mutual information value, to weight each mutual information value based on the amount of information contained in that value, providing automatic weighting scheme knowledge balancing.

By negating the total AMI, the feature distillation objective becomes:

$$L_{AMI}=-\Sigma_{i=1 \ldots T, i\neq k}H(F_i)I(F_i;F_k) \quad \text{Eq. (9)}$$

Since both the entropy and mutual information are non-negative, Eq. (9) is minimized when each $H(F_i)$ and $I(F_i;F_k)$ are maximized during training. The features with higher entropy are generally to be more informative. Thus, the associated mutual information components are weighted more importantly in the final objective. This process distills knowledge bi-directionally between features and is adaptive because the weighting process is differential and automatic, given specific data samples.

In some examples, arrangement 100 is implemented in a cloud environment, and NN 110 is trained and fine-tuned in the cloud environment and then deployed in a cloud environment. In some scenarios, NN 110 is trained and fine-tuned in a cloud environment and deployed in a customer premises, such as on an IoT device. In some scenarios, NN 110 is trained and fine-tuned in a cloud environment, deployed in a customer premises, such as on an IoT device, and subject to further fine-tuning in the deployed environment.

Figure 2:
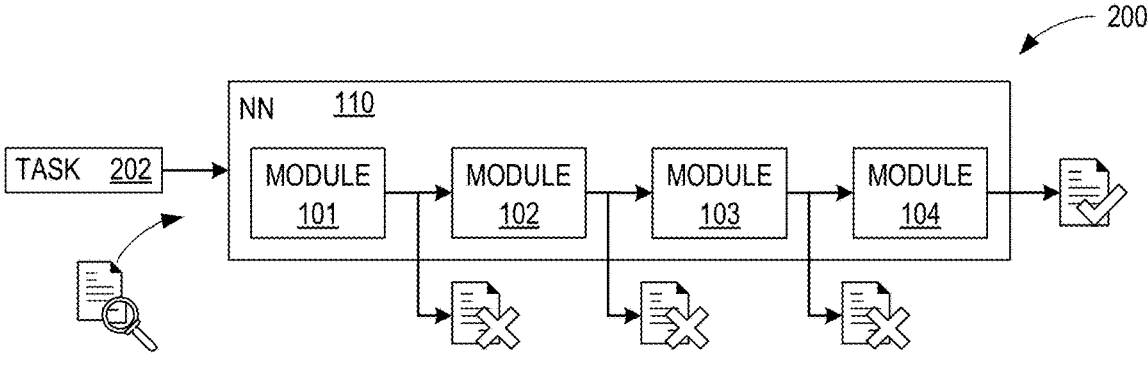
FIG. 2 illustrates compression of a neural network (NN) of FIG. 1 after training.
Figure 2:
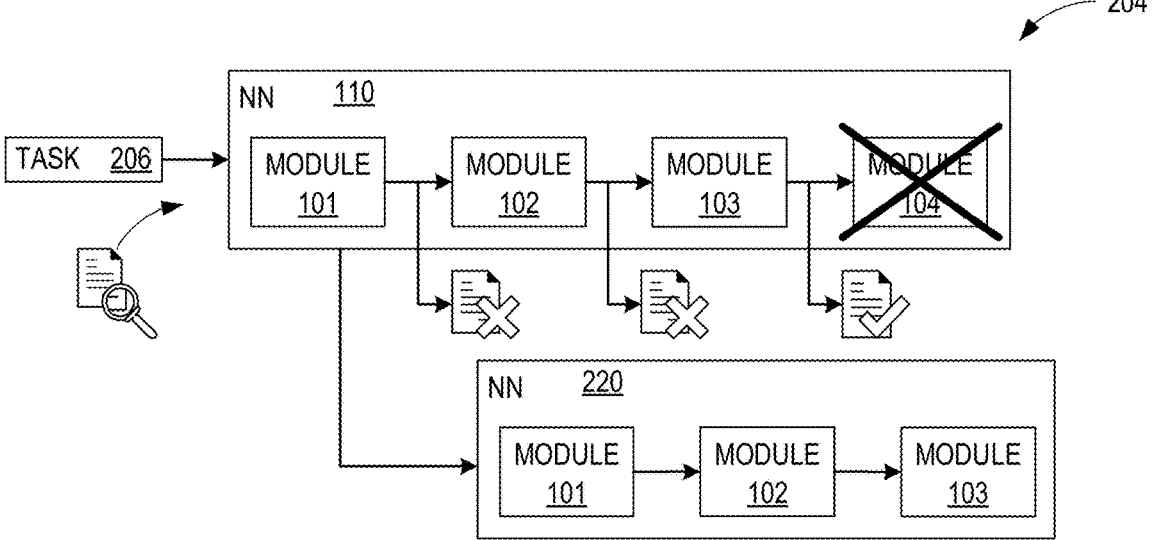
Figure 2:
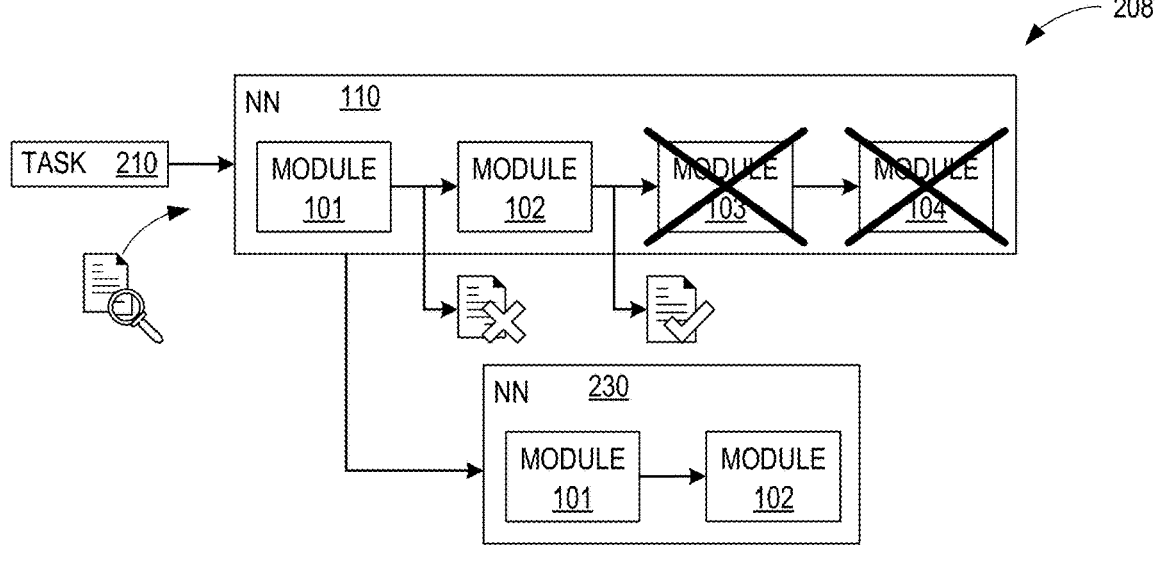

FIG. 2 illustrates compression of NN 110 into a compressed NN 220 and a compressed NN 230. In a scenario 200, NN 110 is assessed for performance of a task 202 using its four modules 101-104. Because task 202 has a requirement for high accuracy, and will be executed on a high-performance computing platform, the output of the complete version of NN 110 is desired. Thus, in scenario 200, NN 110 is not compressed, but will instead be deployed as a complete ML model.

In a scenario 204, NN 110 is assessed for performance of a task 206 using its four modules 101-104. Because task 206 has a slightly lesser requirement for accuracy, and will be executed on a medium-performance computing platform, the output from module 103 provides sufficient performance/speed and performance/size trade-offs. Thus, in scenario 204, NN 110 is compressed by deleting module 104. This produces a compressed NN 220 that has three modules 101-103.

In a scenario 208, NN 110 is assessed for performance of a task 210 using its four modules 101-104. Because task 210 has a lesser requirement for accuracy, and will be executed on an edge device, with limited power, the output from module 102 provides sufficient performance/speed and performance/size trade-offs. Thus, in scenario 208, NN 110 is compressed by deleting both module 104 and module 103. This produces a compressed NN 230 that has two modules 101 and 102. In some scenarios, for example with a highly-restrictive deployment scenario, a compressed NN with only module 101 may be used.

Figure 3:
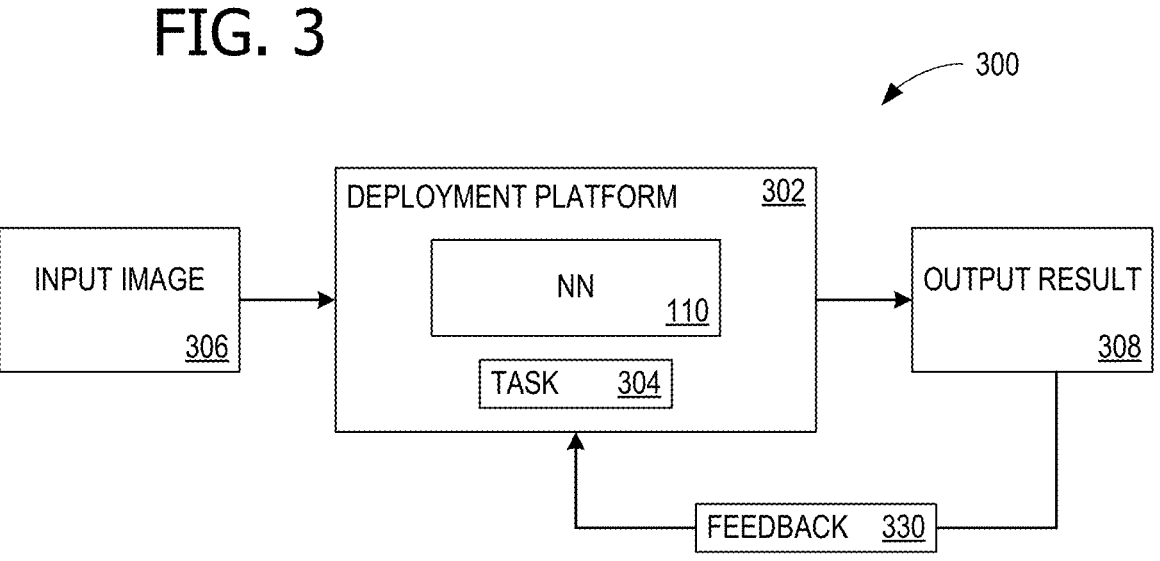
FIG. 3 illustrates deployment and operation scenarios for the NN of FIG. 1 and a compressed NN of FIG. 2.
Figure 3:
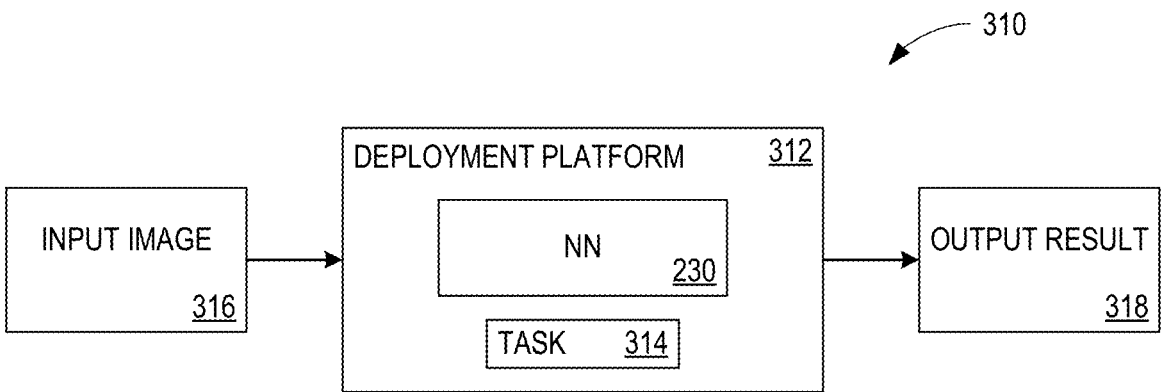

FIG. 3 illustrates deployment and operation scenarios for NN 110 and compressed NN 230. In a scenario 300, NN 110 is deployed on a deployment platform 302 (e.g., computing device 700 of FIG. 7) to perform a task 304. In some examples, task 304 is a CV task, such as image classification, object detection, or decoding (or another task). Deployment platform 302 executes NN 110 on an input image 306 to produce an output result 308. In some examples, deployment platform 302 comprises a cloud environment. In some examples, deployment platform 302 comprises an on-prem environment, such as an IoT device or a customer's local computer network.

In some examples (e.g., when deployment platform 302 comprises an on-prem environment), during deployment operations, user feedback 330 for output result 308 is used to provide further refinement of NN 110. For example, if a user determines that output result 308 is correct for input image 306, the user provides user feedback 330, which is used to further fine-tune NN 110. This further fine-tuning is a third training stage (after initial training with training data 152, and initial fine-tuning with training data 154). Similarly to the initial training and fine-tuning, this further fine-tuning occurs with self-distillation.

In a scenario 310, NN 230 is deployed on a deployment platform 312 (e.g., an edge device version of computing device 700) to perform a task 314. In some examples, task 314 is a CV task. Deployment platform 312 executes NN 230 on an input image 316 to produce an output result 318. A comparison of scenarios 300 and 310 highlights one of the advantages of arrangement 100. Both complete NN 110 and compressed NN 230 were trained with a single training regimen. That is, in some examples, NN 230 does not require any further training, as is already trained for high performance because the knowledge balancing fed backward from the more accurate output of module 104 into modules 101 and 102—balancing performance of tasks across the modules, rather than permitting knowledge to become concentrated (unbalanced) in the later modules.

Figure 4:
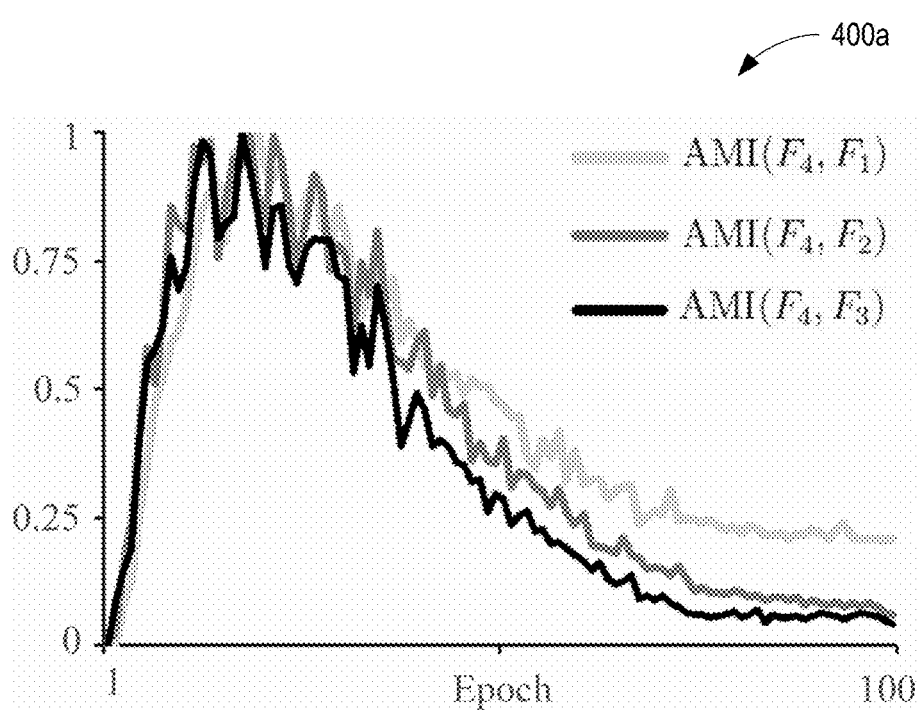
FIG. 4 shows graphs illustrating AMI values during training, when using the arrangement of FIG. 1.
Figure 4:
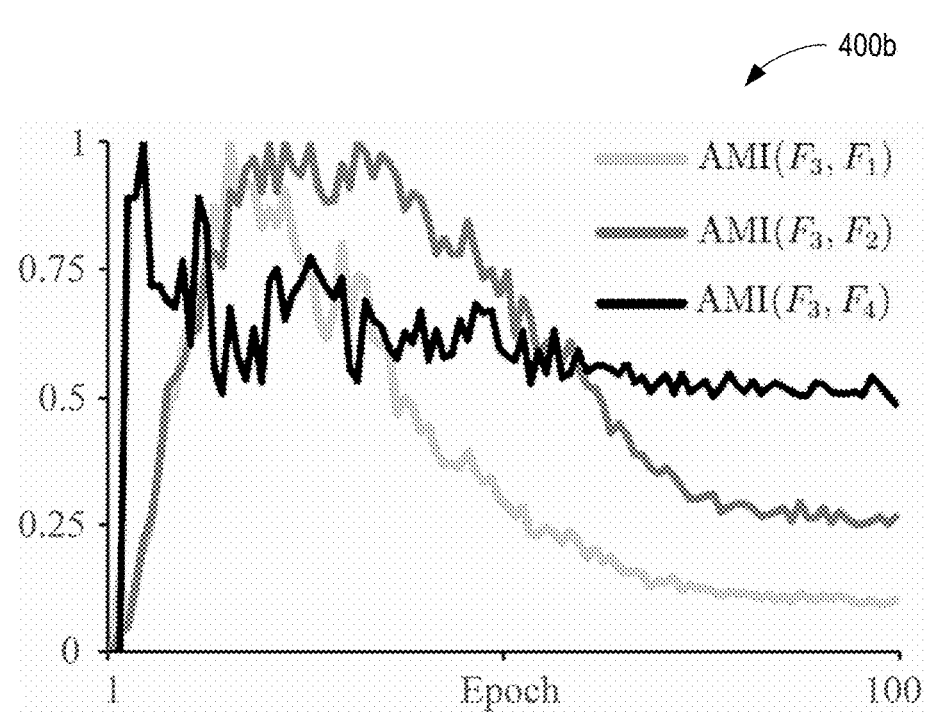

FIG. 4 shows graphs 400a and 400b illustrating AMI values as a function of the epoch count, using arrangement 100 for a decoding task. Graph 400a shows curves for AMI between feature output 124a and each of feature outputs 124b ($F_4$, $F_3$), 124c ($F_4$, $F_2$), and 124d ($F_4$, $F_1$). For graph 400a, module 104 is the base module with k=4, such that $F_k=F_4$. Graph 400b illustrates another degree of flexibility in arrangement 100. For graph 400b, module 104 is the base module with k=3, such that $F_k=F_3$. Thus, graph 400b shows curves for AMI between feature output 124b and each of feature outputs 124c ($F_3$, $F_2$), 124d ($F_3$, $F_1$), and 124a ($F_3$, $F_4$).

Referring back to FIG. 1A, in view of the training results shown in FIG. 4, the upper layers of the decoder directly reconstruct the pixels, and thus contain rich local information. The self-distillation informs the upper layers with the knowledge from layers closer to the high-level latent variables which directly governs the data generation process. In the shallow modules, self-distillation guides the lower layers with knowledge extracted by the upper layers that projects to the pixel space, which plays a major role to help reconstruct the pixels in the shallow modules.

Figure 5A:
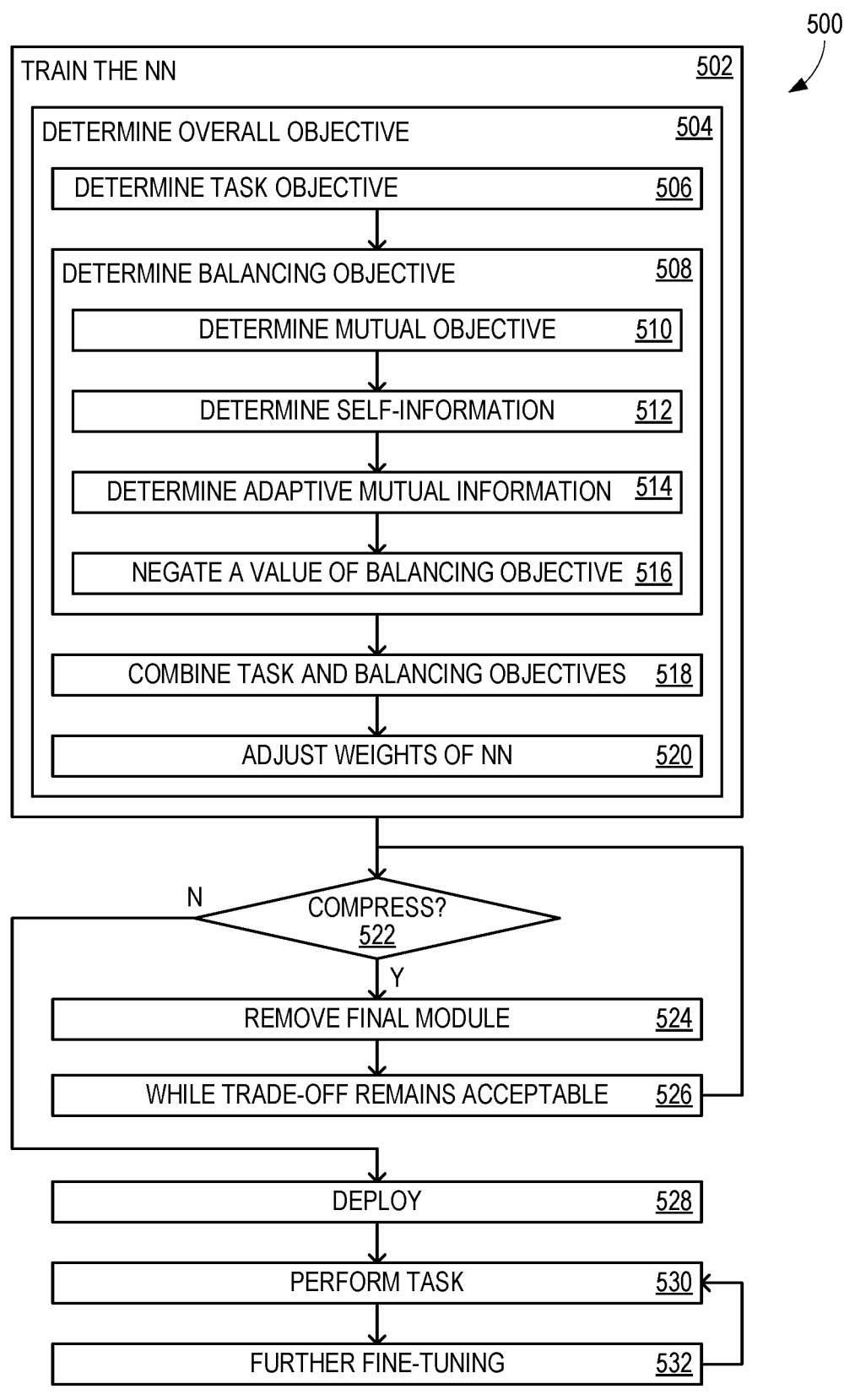
FIGS. 5A and 5B are flowcharts illustrating exemplary operations that may be performed using the arrangement of FIG. 1 and NNs shown in FIGS. 2 and 3.

FIG. 5A is a flowchart 500 illustrating exemplary operations that may performed using arrangement 100 and NNs shown in FIGS. 2 and 3. In some examples, operations described for flowchart 500 are performed by computing device 700 of FIG. 7. Flowchart 500 commences with training NN 110 in operation 502, which is performed using operations 504-520. In some examples, NN 110 comprises a CNN. In some examples, NN 110 comprises a plurality of modules 101-104. In some examples, each module of the plurality of modules comprises a plurality of layers (e.g., L1011-L1014).

Operation 504, which is performed using operations 506-518, includes determining overall objective 140. Determining overall objective 140 comprises combining task objective 120a with balancing objective 130b. In some examples, training NN 110 comprises adjusting weights (e.g., weights W1011-W1015) of NN 110 to minimize overall objective 140. Operation 506 includes, for NN 110 having a plurality of modules, determining task objective 102a for at least final module 104 of the plurality of modules. Task objective 120a provides direct supervision from task labels. In some examples, task objective 102b is determined using at least an output (e.g., feature output 124b) of an intermediate module (e.g., module 103) of the plurality of modules. In some examples, task objectives 102c and 102d are determined using outputs (e.g., feature outputs 124c and 124d) of additional intermediate modules (e.g., modules 101 and 102). Task objectives 120a-120d (whichever are determined) are combined to provide task objective 120.

Operation 508, which is performed using operations 510-516, includes, for NN 110, determining balancing objective 130b using at least output (e.g., feature output 124a) of final module 104 and output (e.g., feature output 124b) of intermediate module 103 of the plurality of modules. Balancing objective 130b enforces balancing knowledge from different features. Operation 510 includes determining mutual information 132b between intermediate module output (feature output 124b) and the output (feature output 124a) of final module 104. Operation 512 includes determining self-information 134b for intermediate module output (feature output 124b). In some examples, operations 510 and 512 are performed for all pairings of module 104 with each of the intermediate modules 101-103.

Operation 514 includes determining adaptive mutual information. Determining the adaptive mutual information comprises combining (1) mutual information between intermediate module outputs and the output of the final module with (2) self-information for the intermediate module output. In some examples, combining the mutual information between the intermediate module output and the output of the final module with the self-information for the intermediate module output comprises multiplying the mutual information between the intermediate module output and the output of the final module by the self-information for the intermediate module output.

Operation 516 includes negating a positive value of balancing objective 130b (or balancing objective 130, which includes balancing objectives 130a-130d), such that maximizing the positive value of balancing objective 130b minimizes balancing objective 130b (or balancing objective 130). The negated positive value of balancing objective 130b (or balancing objective 130) comprises the adaptive mutual information.

Operation 518 determines overall objective 140, which comprises combining task objective 120a with balancing objective 130b (or combining task objective 120 with balancing objective 130, when multiple intermediate modules are used). In some examples, combining task objective 120a with balancing objective 130b comprises summing task objective 120a and balancing objective 130b. Operation 520 adjusts weights of NN 110 to minimize overall objective 140. Adjusting weights of NN 110 to minimize overall objective 140 comprises distilling knowledge between features, comprises self-distilling knowledge, and also comprises knowledge balancing self-distillation.

Decision operation 522 determines whether a compressed NN will provide a sufficient performance/size and performance/speed trade-off. If so, operation 524 compresses NN 110 into compressed NN 220 or 230 by deleting at least final module 104 (or whatever is the final module on subsequent passes through operation 524). In some examples, compressing NN 110 comprises deleting at least final module 104 and penultimate module 103. Operation 526 includes deleting additional modules while the performance/size and performance/speed trade-offs remain sufficient.

NN 110 or compressed NN 230 is deployed in operation 526. Operation 530 includes performing a computer vision task (e.g., task 304) with NN 110 (a deployed NN) or performing a computer vision task (e.g., task 314) with compressed NN 220 or 230 (a deployed compressed NN). In operation 532, user feedback 330 for output result 308 is used to further fine-tune NN 110.

Figure 5B:
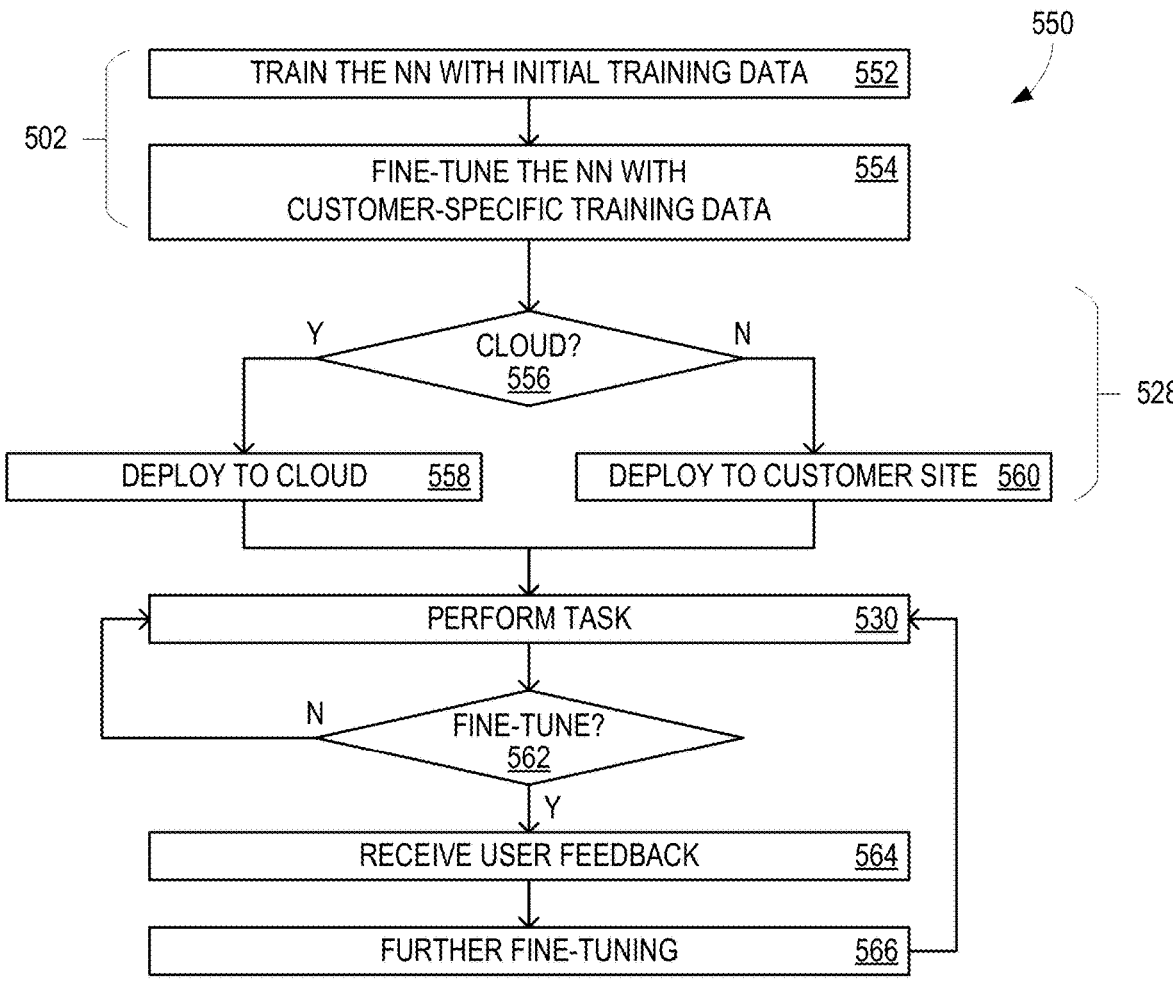

FIG. 5B is a flowchart 550 illustrating exemplary operations that may performed using arrangement 100 and NNs shown in FIGS. 2 and 3. In some examples, operations described for flowchart 550 are performed by computing device 700 of FIG. 7. Training operation 502 of flowchart 500 is shown as comprising two operations 552 and 554, which are initial training of NN 110 with generic training data (e.g., training data 152) and fine-tuning NN 110 with customer-specific training data (e.g., training data 154).

Deployment operation 528 of flowchart 500 is shown as comprising a decision operation 556 and two alternative deployment operations 558 and 560. Decision operation 556 determines whether NN 110 will be deployed to a cloud environment or a customer on-prem environment. If a cloud environment, operation 558 deploys NN 110 (or a compressed version of NN 110) to a cloud environment. Otherwise, operation 560 deploys NN 110 (or a compressed version of NN 110) to an on-prem environment.

NN 110 performs its task, as indicated in operation 530 (same as from flowchart 500). A decision operation 562 determines whether deployed NN 110 will continue operating using only its initial training, or whether further fine-tuning will occur on deployed NN 110. In some examples, further fine-tuning occurs in on-prem deployments. If further fine-tuning does occur, user feedback 330 is received in operation 564 (e.g., indicating that output result 308 was correct for input image 306). Operation 566 includes, based on at least the user feedback, perform fine-tuning of the NN, wherein the fine-tuning comprises adjusting weights of the NN to minimize the overall objective (which is similar to operation 532 of flowchart 500). The fine-tuning during deployment is effectively further training, and occurs with self-distillation, as described above for the initial training.

Figure 6:
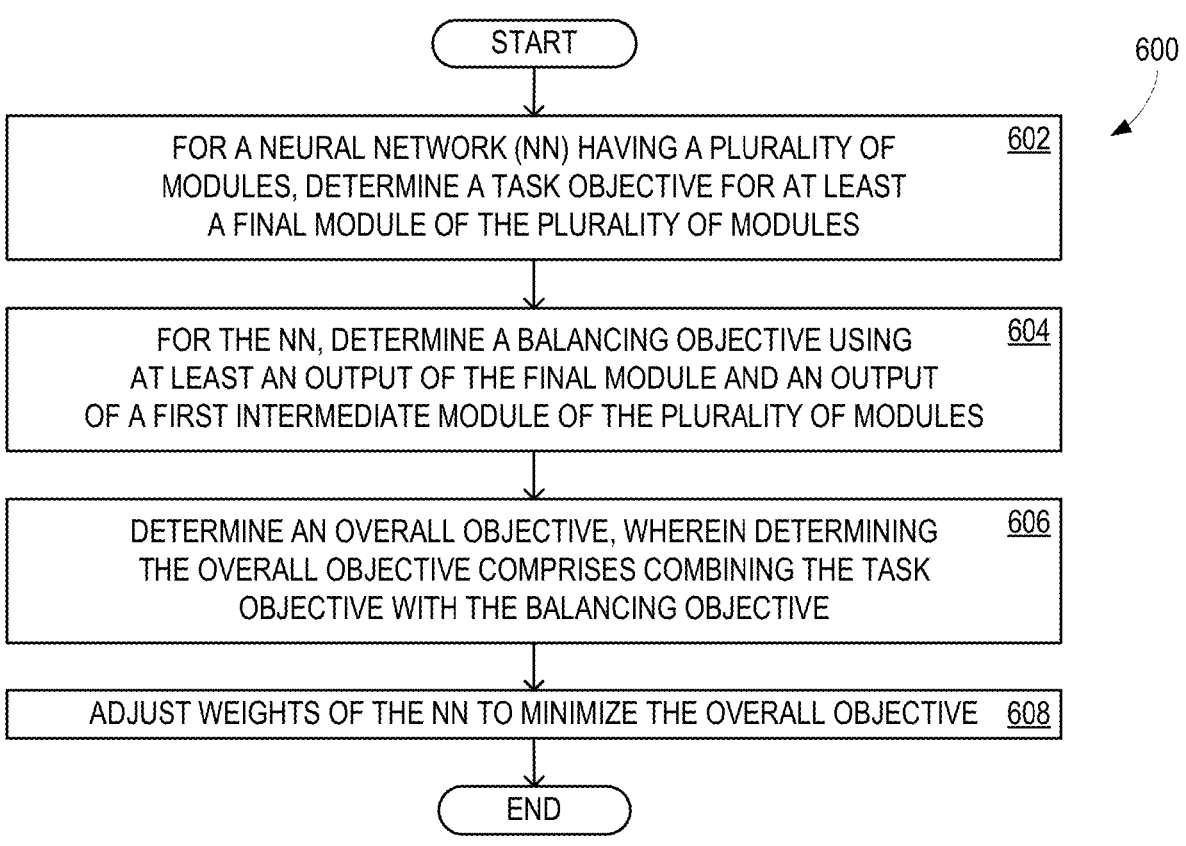
FIG. 6 is another flowchart illustrating exemplary operations that may be performed using the arrangement of FIG. 1.

FIG. 6 is a flowchart 600 illustrating exemplary operations associated with arrangement 100. In some examples, operations described for flowchart 600 are performed by computing device 700 of FIG. 7. Flowchart 600 commences with operation 602, which includes, for an NN having a plurality of modules, determining a task objective for at least a final module of the plurality of modules. Operation 604 includes, for the NN, determining a balancing objective using at least an output of the final module and an output of a first intermediate module of the plurality of modules. Operation 606 includes determining an overall objective, wherein determining the overall objective comprises combining the task objective with the balancing objective. Operation 608 includes adjusting weights of the NN to minimize the overall objective.

Additional Examples

An example system comprises: a processor; and a computer-readable medium storing instructions that are operative upon execution by the processor to: for a neural network (NN) having a plurality of modules, determine a task objective for at least a final module of the plurality of modules; for the NN, determine a balancing objective using at least an output of the final module and an output of a first intermediate module of the plurality of modules; determine an overall objective, wherein determining the overall objective comprises combining the task objective with the balancing objective; and adjust weights of the NN to minimize the overall objective.

An example computerized method comprises: for an NN having a plurality of modules, determining a task objective for at least a final module of the plurality of modules; for the NN, determining a balancing objective using at least an output of the final module and an output of a first intermediate module of the plurality of modules; determining an overall objective, wherein determining the overall objective comprises combining the task objective with the balancing objective; and adjusting weights of the NN to minimize the overall objective.

One or more example computer storage devices has computer-executable instructions stored thereon, which, on execution by a computer, cause the computer to perform operations comprising: for an NN having a plurality of modules, determining a task objective for at least a final module of the plurality of modules; for the NN, determining a balancing objective using at least an output of the final module and an output of a first intermediate module of the plurality of modules; determining an overall objective, wherein determining the overall objective comprises combining the task objective with the balancing objective; and adjusting weights of the NN to minimize the overall objective.

One or more example computer storage devices has computer-executable instructions stored thereon, which, on execution by a computer, cause the computer to perform operations comprising: for a deployed neural network (NN) having a plurality of modules, determining a task objective for at least a final module of the plurality of modules; for the NN, determining a balancing objective using at least an output of the final module and an output of a first intermediate module of the plurality of modules; determining an overall objective, wherein determining the overall objective comprises combining the task objective with the balancing objective; receiving user feedback on an output result of the NN; and based on at least the user feedback, perform fine-tuning of the NN, wherein the fine-tuning comprises adjusting weights of the NN to minimize the overall objective.

Alternatively, or in addition to the other examples described herein, examples include any combination of the following:

determining the overall objective comprises negating a positive value of the balancing objective, such that maximizing the positive value of the balancing objective minimizes the balancing objective;

determining the balancing objective further comprises, for each intermediate module output used, in addition to the output of the final module: determining mutual information between the intermediate module output and the output of the final module; determining self-information for the intermediate module output; and determining adaptive mutual information, wherein determining the adaptive mutual information comprises combining the mutual information between the intermediate module output and the output of the final module with the self-information for the intermediate module output, and wherein the negated positive value of the balancing objective comprises the adaptive mutual information;

combining the mutual information between the intermediate module output and the output of the final module with the self-information for the intermediate module output comprises multiplying the mutual information between the intermediate module output and the output of the final module by the self-information for the intermediate module output;

combining the task objective with the balancing objective comprises summing the task objective and the balancing objective;

determining the task objective further comprises using at least an output of a second intermediate module of the plurality of modules;

compressing the NN;

compressing the NN comprises deleting at least the final module;

deploying the compressed NN;

performing a computer vision task with the deployed compressed NN;

deploying the NN;

during deployment of the NN, perform fine-tuning of the NN with user feedback;

performing a computer vision task with the deployed NN;

the NN comprises a CNN;

each module of the plurality of modules comprises a plurality of layers;

training the NN comprises adjusting weights of the NN to minimize the overall objective;

compressing the NN comprises deleting at least the final module and a penultimate module;

the task objective provides direct supervision from task labels;

the balancing objective enforces balancing knowledge from different features;

adjusting weights of the NN to minimize the overall objective comprises distilling knowledge between features;

adjusting weights of the NN to minimize the overall objective comprises self-distilling knowledge; and adjusting weights of the NN to minimize the overall objective comprises knowledge balancing self-distillation.

While the aspects of the disclosure have been described in terms of various examples with their associated operations, a person skilled in the art would appreciate that a combination of operations from any number of different examples is also within scope of the aspects of the disclosure.

Example Operating Environment

FIG. 7 is a block diagram of an example computing device 700 for implementing aspects disclosed herein, and is designated generally as computing device 700. In some examples, one or more computing devices 700 are provided for an on-premises computing solution. In some examples, one or more computing devices 700 are provided as a cloud computing solution. In some examples, a combination of on-premises and cloud computing solutions are used. Computing device 700 is but one example of a suitable computing environment and is not intended to suggest any limitation as to the scope of use or functionality of the examples disclosed herein, whether used singly or as part of a larger set.

Neither should computing device 700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 700 includes a bus 710 that directly or indirectly couples the following devices: computer storage memory 712, one or more processors 714, one or more presentation components 716, input/output (I/O) ports 718, I/O components 720, a power supply 722, and a network component 724. While computing device 700 is depicted as a seemingly single device, multiple computing devices 700 may work together and share the depicted device resources. For example, memory 712 may be distributed across multiple devices, and processor(s) 714 may be housed with different devices.

Bus 710 represents what may be one or more busses (such as an address bus, data bus, or a combination thereof). Although the various blocks of FIG. 7 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 7 and the references herein to a "computing device." Memory 712 may take the form of the computer storage media referenced below and operatively provide storage of computer-readable instructions, data structures, program modules and other data for the computing device 700. In some examples, memory 712 stores one or more of an operating system, a universal application platform, or other program modules and program data. Memory 712 is thus able to store and access data 712a and instructions 712b that are executable by processor 714 and configured to carry out the various operations disclosed herein.

In some examples, memory 712 includes computer storage media. Memory 712 may include any quantity of memory associated with or accessible by the computing device 700. Memory 712 may be internal to the computing device 700 (as shown in FIG. 7), external to the computing device 700 (not shown), or both (not shown). Additionally, or alternatively, the memory 712 may be distributed across multiple computing devices 700, for example, in a virtualized environment in which instruction processing is carried out on multiple computing devices 700. For the purposes of this disclosure, "computer storage media," "computer-storage memory," "memory," and "memory devices" are synonymous terms for the computer-storage memory 712, and none of these terms include carrier waves or propagating signaling.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flow charts discussed below and depicted in the accompanying drawings. Moreover, in some examples, the processor(s) 714 represent an implementation of analog techniques to perform the operations described herein. For example, the operations may be performed by an analog client computing device 700 and/or a digital client computing device 700. Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. I/O ports 718 allow computing device 700 to be logically coupled to other devices including I/O components 720, some of which may be built in. Example I/O components 720 include, for example but without limitation, a microphone, joystick, game pad, satellite dish, scanner, printer, wireless device, etc.

The computing device 700 may operate in a networked environment via the network component 724 using logical connections to one or more remote computers. In some examples, the network component 724 includes a network interface card and/or computer-executable instructions (e.g., a driver) for operating the network interface card. Communication between the computing device 700 and other devices may occur using any protocol or mechanism over any wired or wireless connection. In some examples, network component 724 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 724 communicates over wireless communication link 726 and/or a wired communication link 726a to a cloud resource 728 across network 730. Various different examples of communication links 726 and 726a include a wireless connection, a wired connection, and/or a dedicated link, and in some examples, at least a portion is routed through the internet.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a computer-readable medium storing instructions that are operative upon execution by the processor to:

receive a computer vision task;

for a neural network (NN) having a plurality of modules, determine a task objective for at least a final module of the plurality of modules;

for the NN, determine a balancing objective using at least an output of the final module and an output of a first intermediate module of the plurality of modules, wherein determining the balancing objective comprises:

for each intermediate module output for a plurality of intermediate modules of the plurality of modules and the output of the final module:

determining mutual information between the intermediate module output and the output of the final module;

extracting self-information from the intermediate module output; and combining the mutual information and the self-information;

determine an overall objective, wherein determining the overall objective comprises combining the task objective with the balancing objective;

adjust weights of the NN to minimize the overall objective;

determine whether a compressed NN meets an accuracy requirement for the computer vision task;

based on determining the compressed NN meets the accuracy requirement, compress the NN by deleting the final module;

continue deleting an additional module from the plurality of modules while the compressed NN meets the accuracy requirement; and deploy the compressed NN to perform the computer vision task with the compressed NN.

2. The system of claim 1, wherein determining the overall objective comprises:

negating a positive value of the balancing objective, such that maximizing the positive value of the balancing objective minimizes the balancing objective.

3. The system of claim 2, wherein determining the balancing objective further comprises:

for each intermediate module output for the plurality of intermediate modules of the plurality of modules and the output of the final module, determining adaptive mutual information, wherein determining the adaptive mutual information comprises combining:

the mutual information between the intermediate module output and the output of the final module with the self-information for the intermediate module output, and wherein the negated positive value of the balancing objective comprises the adaptive mutual information.

4. The system of claim 3, wherein combining the mutual information between the intermediate module output and the output of the final module with the self-information for the intermediate module output comprises multiplying the mutual information between the intermediate module output and the output of the final module by the self-information for the intermediate module output.

5. The system of claim 1, wherein the instructions are further operative to:

during deployment of the NN, perform fine-tuning of the NN with user feedback.

6. The system of claim 1, wherein determining the task objective further comprises:

using at least an output of a second intermediate module of the plurality of modules.

7. The system of claim 1, wherein the instructions are further operative to:

receive a second computer vision task, the second computer vision task with a lesser accuracy requirement; and compress the NN to a second compressed NN by deleting two or more modules from the NN, wherein the second compressed NN meets the lesser accuracy requirement, and wherein the second compressed NN has fewer modules than the compressed NN.

8. A computerized method comprising:

receiving a computer vision task;

for a neural network (NN) having a plurality of modules, determining a task objective for at least a final module of the plurality of modules;

for the NN, determining a balancing objective using at least an output of the final module and an output of a first intermediate module of the plurality of modules, wherein determining the balancing objective comprises:

for each intermediate module output for a plurality of intermediate modules of the plurality of modules and the output of the final module:

determining mutual information between the intermediate module output and the output of the final module;

extracting self-information from the intermediate module output; and combining the mutual information and the self-information;

determining an overall objective, wherein determining the overall objective comprises combining the task objective with the balancing objective;

adjusting weights of the NN to minimize the overall objective;

determining whether a compressed NN meets an accuracy requirement the computer vision task;

based on determining the compressed NN meets the accuracy requirement, compressing the NN by deleting the final module;

continuing deleting an additional module from the plurality of modules while the compressed NN meets the accuracy requirement; and deploying the compressed NN to perform the computer vision task with the compressed NN.

9. The computerized method of claim 8, wherein determining the overall objective comprises:

negating a positive value of the balancing objective, such that maximizing the positive value of the balancing objective minimizes the balancing objective.

10. The computerized method of claim 9, wherein determining the balancing objective further comprises:

for each intermediate module output for the plurality of intermediate modules of the plurality of modules and the output of the final module, determining adaptive mutual information, wherein determining the adaptive mutual information comprises combining the mutual information between the intermediate module output and the output of the final module with the self-information for the intermediate module output, and wherein the negated positive value of the balancing objective comprises the adaptive mutual information.

11. The computerized method of claim 10, wherein combining the mutual information between the intermediate module output and the output of the final module with the self-information for the intermediate module output comprises multiplying the mutual information between the intermediate module output and the output of the final module by the self-information for the intermediate module output.

12. The computerized method of claim 8, wherein combining the task objective with the balancing objective comprises summing the task objective and the balancing objective.

13. The computerized method of claim 8, wherein determining the task objective further comprises:

using at least an output of a second intermediate module of the plurality of modules.

14. The computerized method of claim 8, further comprising:

receiving a second computer vision task, the second computer vision task with a lesser accuracy requirement; and compressing the NN to a second compressed NN by deleting two or more modules from the NN, wherein the second compressed NN meets the lesser accuracy requirement, and wherein the second compressed NN has fewer modules than the compressed NN.

15. One or more computer storage devices having computer-executable instructions stored thereon, which, on execution by a computer, cause the computer to perform operations comprising:

receive a computer vision task;

for a deployed neural network (NN) having a plurality of modules, determining a task objective for at least a final module of the plurality of modules;

for the NN, determining a balancing objective using at least an output of the final module and an output of a first intermediate module of the plurality of modules, wherein determining the balancing objective comprises:

for each intermediate module output for a plurality of intermediate modules of the plurality of modules and the output of the final module:

determining mutual information between the intermediate module output and the output of the final module;

extracting self-information from the intermediate module output; and combining the mutual information and the self-information;

determining an overall objective, wherein determining the overall objective comprises combining the task objective with the balancing objective;

receiving user feedback on an output result of the NN;

based on at least the user feedback, perform fine-tuning of the NN, wherein the fine-tuning comprises adjusting weights of the NN to minimize the overall objective;

determine whether a compressed NN meets an accuracy requirement for accuracy for the computer vision task;

based on determining the compressed NN meets the accuracy requirement, compress the NN by deleting the final module;

continue deleting an additional module from the plurality of modules while the compressed NN meets the accuracy requirement; and deploy the compressed NN to perform the computer vision task with the compressed NN.

16. The one or more computer storage devices of claim 15, wherein determining the overall objective comprises:

negating a positive value of the balancing objective, such that maximizing the positive value of the balancing objective minimizes the balancing objective.

17. The one or more computer storage devices of claim 16, wherein determining the balancing objective further comprises:

for each intermediate module output for a plurality of intermediate modules of the plurality of modules and the output of the final module, determining adaptive mutual information, wherein determining the adaptive mutual information comprises combining the mutual information between the intermediate module output and the output of the final module with the self-information for the intermediate module output, and wherein the negated positive value of the balancing objective comprises the adaptive mutual information.

18. The one or more computer storage devices of claim 17, wherein combining the mutual information between the intermediate module output and the output of the final module with the self-information for the intermediate module output comprises multiplying the mutual information between the intermediate module output and the output of the final module by the self-information for the intermediate module output.

19. The one or more computer storage devices of claim 15, wherein combining the task objective with the balancing objective comprises summing the task objective and the balancing objective, and wherein determining the task objective further comprises using at least an output of a second intermediate module of the plurality of modules.

20. The one or more computer storage devices of claim 15, wherein the operations further comprise:

receiving a second computer vision task, the second computer vision task with a lesser accuracy requirement; and compressing the NN to a second compressed NN by deleting two or more modules from the NN, wherein the second compressed NN meets the lesser accuracy requirement, and wherein the second compressed NN has fewer modules than the compressed NN.

\* \* \* \* \*